Oct. 29, 1968   J. R. GIER, JR   3,407,874

FIN TUBE ASSEMBLAGE FOR HEAT EXCHANGERS

Filed May 19, 1966

INVENTOR.
John R. Gier, Jr.,
BY
John H. Leonard,
his ATTORNEY.

3,407,874
FIN TUBE ASSEMBLAGE FOR
HEAT EXCHANGERS
John R. Gier, Jr., Hines Hill Road,
Hudson, Ohio 44236
Filed May 19, 1966, Ser. No. 551,436
4 Claims. (Cl. 165—151)

ABSTRACT OF THE DISCLOSURE

The fin tube comprises a tube with fins formed of two strips of sheet metal each corrugated to provide inner and outer crests with connecting side walls. Each strip has a notch extending in a direction transversely of its corrugations through its inner crest and a portion of each side wall adjacent the inner crest. This notch is made by punching a hole in the metal before corrugating so that the notch is bounded by a peripherally exposed edge surface of the metal adjacent the notch, and which edge extends the full thickness of the metal. Each notch is of such shape and depth that it fits at least one-half the peripheral outer wall of the tube. Two strips thus formed are placed on diametrically opposite sides of the tube so that the exposed edge surfaces of the notches are juxtaposed against the peripheral wall of the tube and are directly bonded to the tube wall by capillary films of soldering or brazing material.

The strips may be installed with the inner crests of one strip acting as spacers between the inner crests of the opposite strip, thus assuring that the notch edges are seated in intimate contact with the tube wall and that the corrugations are spaced properly endwise of the tube. For some uses, the inner crests of one strip are aligned with the inner crests of the other strip. Adjacent crests in contact with each other are bonded together by the capillary films of solder or braze material.

---

This invention relates to fin tubes for heat exchangers and the like and to a method of making the same.

Heretofore many attempts have been made to develop fin tubes and methods of manufacture therof such that the fin tubes can be produced in large quantities throughout a wide range of lengths and sizes within practical economic limits.

One method is that disclosed in U.S. patent to Bennett et al., No. 1,865,427 of July 5, 1932, wherein two separate strips of sheet metal are corrugated with transverse corrugations which are arranged in a row extending lengthwise of the strip. To obtain maximum contact with the tube, the midportions of the inner crests of the corrugations of each strip are distorted to form curvilinear concavities or saddles, each of which is shaped to embrace about one half of the circumferential wall of the tube. Two strips are applied to the tube at diametrically opposite sides with the saddles aligned with each other and together embracing the entire circumference of the tube. The undistorted portions adjacent the saddles of the inner crests engage each other in face of face contact. In this position, the two strips are clamped to the tube. The side walls of the corrugations thus provide fins each of which completely surrounds the tube.

In tube of reasonably large diameter, such as 1½ inches and up, with the fins spaced well apart so as to afford ready access to the space between adjacent fins, especially where welding or brazing are not required, corrugated strips with saddles of this nature are satisfactory. This is because, with tubes of substantial size, a few thousandths of an inch in out-of-roundness, small projections or surface irregularities, or normal manufacturing tolerances, are such a small part of the total diameter that the saddles can be made to fit the tubes adequately despite such variations from the optimum. Furthermore, the corrugated strips themselves do not have to be so accurately formed, as they can be warped and stressed by rugged tooling into adequate contact with the circumferential wall of the tube. Likewise, if, due to manufacturing inaccuracies, inner crest portions of adjacent opposite aligned saddles should happen to engage each other and space the saddle slightly out of full contact with the tube wall, the strips can be forcefully distorted in situ sufficiently to overcome this effect and assure adequate contact of the saddles and tube wall.

As the diameter of the tube and the thickness and spacing of the fins are reduced, the arithmetical amount of out-of-roundness, surface irregularity, dimensional inaccuracy, and the like, constitutes an increasingly larger portion of deviation from the optimum manufacturing tolerances permitted. Consequently, greater and greater precision is required in forming the tube and the strips of the saddle type described in the above patent.

This approach was modified in the patent to L. C. Smith, No. 1,970,105, issued Aug. 14, 1934, by limiting the circumferential extent of each saddle to less than semicircular. As a result, portions of the inner crests adjacent the saddles are spaced a considerable distance apart from each other circumferentially of the tube. Consequently they cannot engage and interfere with seating of the saddles on the circumferential wall of the tube. This approach permitted the forming of the tube and the strips with less precision than theretofore required.

Another approach is disclosed in the patent to C. W. Parris, No. 3,189,087, issued June 15, 1965, wherein, instead of corrugated strips, a plurality of separate flat sheets are used. Each sheet is notched at one edge with a substantially semicircular notch precisely formed to fit the particular tube. Suitable holding elements extending longitudinally of the tube are welded to the exterior of the tube diametrically opposite from each other. The separate sheets are then arranged on the tube in pairs, the sheets of each pair being diametrically opposite each other with the edges which define their notches in embracing relation to the tube and with those of their edge portions which are adjacent to the open sides of the notches in contact with the holding elements. In this position the sheets are welded to the holding elements by resistance welding. In a modification therein, said to be for closely spaced fins, each sheet is bent into channel form and a semicircular notch is formed therein opening through the base of the channel. These channels are arranged in pairs with the notches embracing the tube and while so held, are welded to the tube.

These approaches likewise require precision in shape and dimension of the notches and tube, and have the disadvantage that a large number of sheets must be individually handled during fabrication of the fin tube.

In the case of relatively small diameter tubes, another approach is to form washers of the fin sheet material, with the central hole therein of such shape and size as to provide an interference fit with the tube. A small amount of the marginal metal about the central hole is extruded axially or formed into an integral spacing neck or collar. The individual washers are then threaded onto the tube, their spacing being determined by the axial length of the spacing collar selected. This approach also requires precision of parts and individual handling thereof.

Another approach which has proven satisfactory is to wind a strip of metal helically edgewise into stressed relation with the circumferential wall of a tube, followed by subsequent brazing. This edgewise winding method is effective for quantity production, but with presently available techniques it is applicable only to tubes of circular cross section. No satisfactory method is now available for effecting such edgewise helical winding of a thin strip of fin material onto a tube which is slightly out-of-round, and the method does not appear to hold any possibilities in connection with tubes of polygonal, elliptical, or other noncircular cross sections. Furthermore, even in the case of tubes of accurate circular cross section, the method is satisfactory only if the ratio of the width of the fin radially of the tube axis to the thickness of the metal of which the fin is formed is not too great. The thinner the fin material and the smaller the diameter of the tube, the less becomes the capability of edgewise winding of the fin material.

Thus, the prior methods are not of general applicability. Instead, each is useful in a specific limited field.

The invention herein is one which is applicable to fin tubes regardless of the shape and size or diameter of the cross section, and regardless of the ratio of fin width to the thickness of the fin material. It is applicable to fins which are in extremely closely spaced relation from each other in a direction endwise of the tube, as well as to fins which are in widely spaced relation.

It is applicable to fin tubes of which the tube cross section and the width to thickness ratio of the fins and their spacing are such that they cannot be made within economic limits in large commercial quantities by known methods, and also to fin tubes that cannot be made by edgewise helical winding either because the tube cross section is other than circular or, if circular, is of such a small diameter that edgewise helical winding is impractical, if not impossible.

One specific example of such smaller sizes of tubes embodying the invention is a fin tube of which the tube cross-section is circular and has a diameter of $\tfrac{3}{32}$ of an inch; the fins are accurately spaced forty fins to the inch and lie in planes normal to the tube axis; the fin sheet material is 0.001 of an inch in thickness; and the width of the fins normal to the axis of the tube is such as to far exceed the width to thickness ratios heretofore obtainable, the width, regardless of thickness, being dictated only by the particular use to which the fin tube is to be put.

Since the ratio of fin thickness to width is not critical in the present invention, fin material approaching metal foil can be used.

The advantages of the present invention are most pronounced in the case of fin tubes of which the tubes of very small cross-section, many of which cannot be made into fin tubes commercially by known methods, but many advantages also are obtained in the case of much larger fin tubes.

Some examples of tube cross-sections which can be used regardless of size, are oval, elliptical, polygonal, or cross-sections having semicircular ends and straight sides tangent thereto, as when a round tube has been rolled or flattened in cross-section, as sometimes used in automobile radiators.

A round tube with brazed fins may sometimes be bent to smaller radius than an identical bare tube without undue flattening of the tube, as the brazed fins act as reinforcing ribs to retain the tube shape. These examples, however, are not exclusive of other shapes.

The advantages of the present invention are derived from the fact that the sheet or foil material of which the fins are formed need only be bent flatwise, and not edgewise as in helical winding. Edge surfaces of the fin material engage the peripheral wall of the tube and are formed by the simple punching in the flat metal of holes of predetermined developed shape such that when the metal is corrugated by flatwise bending to form fins, the edges of the stamped holes are of the proper shape for embracing the desired portion of the peripheral wall of the tube. Large subassemblies of fin portions are provided, each formed in one piece from a single strip of sheet metal, and each subassembly can be handled as a unit and readily applied to the tube, temporarily secured thereto for subsequent bonding and then metallurgically bonded, thus eliminating the expensive assembly operations wherein each fin is separately handled for bonding. The bond is uniform and continuous about the periphery of the tube for each and every fin, and each strip is bonded throughout the extent of its inner crests to the other strip. Again, the length of the subassemblies need not be limited, wherefore the invention is well adapted to continuous quantity production of fin tubes of whatever length is desired.

The subassemblies are such that precise spacing of the fins is easily attained and can be maintained readily during installation of the fins on the tube without the necessity of complicated and expensive holding and spacing tools.

Also, bending flatwise of thin strips is easier and cheaper than edgewise bending; no precoiling and process anneal is required.

Anchoring the ends of edge wound fin sections is time consuming and tedious hand work, whereas for the subject invention the fin assembly is continuously bonded to itself during assembly on the tube. This process may be readily automated and programmed to provide any desired pattern of finned and bare sections without interrupting the rapid movement of the tube through the assembling machine.

The economies of the invention are especially large in the case of fin tubes having tubes of very small cross-section, and very closely spaced and fins of very thin metal due to the fact that such fin tubes can be manufactured, assembled, and fabricated efficiently, lending itself to automated and programmed procedures.

The resultant fin tube can be made from tubes meeting the commercial standards common for good quality tubes of these small diameters or cross-sections, with the joints between the tube and each fin edge uniform and substantially continuous throughout the entire extent of the fin edge.

Various other objects and advantages will become apparent from the following description wherein reference is made to the drawings, in which.

Figure 1:
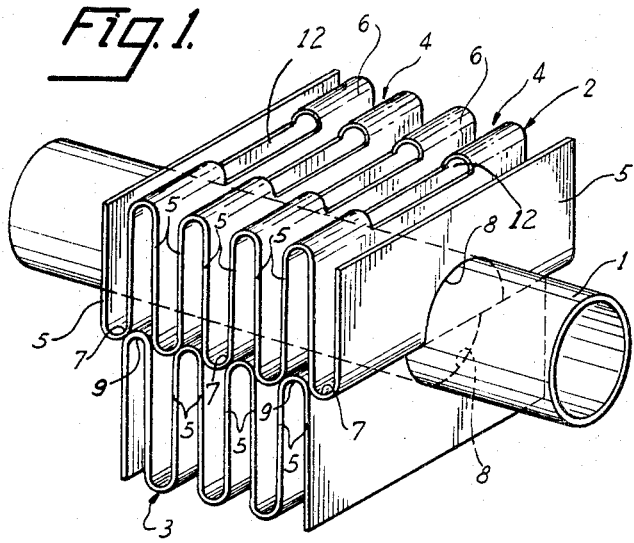
FIG. 1 is a fragmentary perspective view of a length of fin tube embodying the principles of the present invention.
Figure 2:
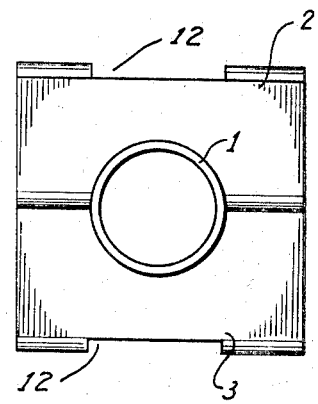
FIG. 2 is a right hand elevation of the fin tube illustrated in FIG. 1.
Figure 3:
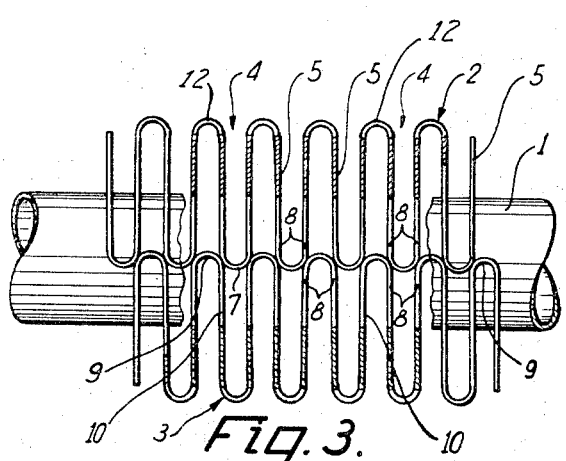
FIG. 3 is a fragmentary longitudinal view of the fin tube illustrated in FIGS. 1 and 2, the upper row of fin portions being shown in vertical section, taken longitudinally of the tube, for clearness in illustration.

For purposes of illustration, the invention is disclosed generally as applied to fin tubes employing tubes of circular cross section and of very small diameter and with the fins very closely spaced and having a very high width to thickness ratio, its use with larger tubes of circular cross section and tubes of noncircular cross section being apparent from the illustrative example.

Referring first to FIGS. 1 through 4, the invention is shown as employing a length of commercial tube 1 of copper or other suitable metal, depending upon the use to which the fin tube is to be put. In order to emphasize the problem involved, the tube is shown enlarged for clearness in illustration. It is a tube of good commercial grade, of actual diameter of $\tfrac{5}{32}$ of an inch, with fins 0.003 of an inch thick and spaced 0.020 of an inch from each other. The tube is not specifically processed to provide extreme precision in shape, diameter, and surface regularity.

The fins of the tube 1 are formed of upper and lower portions comprising an upper corrugated metal strip 2 and a lower corrugated strip 3, respectively. These strips preferably are identical in form and function, and each is composed of metal suitable for the particular use to which the fin tube is to be put.

Referring specifically to strip 2, the strip is provided with a plurality of corrugations, indicated generally at 4, each corrugation comprising a pair of spaced side walls 5, an outer crest 6 and an inner crest 7. Each crest preferably is rounded about an axis extending transversely of the strip.

The strip is provided with notches 8 which are open at the inner crests 7 and each of which extends from its associated inner crest partway into the adjacent side walls 5. Each notch has a semicircular portion which is generally coaxial with, and substantially the same diameter as, the external diameter of the tube 1, so as to engage one-half the circumferential wall of the tube 1.

The side walls 5 of the corrugations of the strip 2 are spaced apart endwise of the tube only about 0.020 of an inch or less. Generally this spacing is so close that it is difficult to provide tooling which can extend between the adjacent side walls 5 for maintaining the spacing during installation of the strip on the tube.

The lower corrugated strip 3 may be identical with the strip 2. It has inner crests 9 with notches 10. The strips 2 and 3 are placed so that the semicircular portions of their notches embrace opposite halves of the circumferential wall of the tube.

It is apparent that two such strips 2 and 3, thus corrugated and notched, can be handled readily as subassemblies during installation of the strips on the tube 1. However, unless considerable care is exercised in the formation of the corrugations and in holding rather close dimensions, the crests 7 and crests 9 may engage each other at opposite ends of their notch wall and prevent close fitting of the edges defining the notches 8 and 10 with the periphery of the tube. In order to reduce difficulties which may be encountered in maintaining satisfactory dimensional accuracy, the strip 2 is placed on the tube 1 with its crests 7 opposite and extending partially into the valley between the crests 9 of the strip 3. As a result, the inner crests of one strip cannot engage the inner crests of the other strip in a manner to arrest movement of the strips toward each other radially of the tube. Consequently both strips 2 and 3 can readily be moved toward each other to positions wherein the edges defining the semicylindrical portions of the notches 8 and 10 engage the tube circumference effectively. When such off-setting of the crests endwise of the tube is employed, the edge of each notch defines not only the semicircular portion but also short, straight portions tangent to the semicircular portion at the ends of the latter so that the crest portions at opposite ends of each notch can pass beyond the diameter of the tube.

In installing the strips 2 and 3, the strips are fed progressively endwise and the tube 1 is moved endwise generally parallel to the strips. As the strips pass a selected location, they are pressed, by suitable rollers or other means, radially of the tube. The crests of one strip, being aligned, as described, with the space between the crests of the opposite strip, and thereby being staggered along the length of the tube, the fitting of the entire semicircular wall portions of the notches 8 and 10 onto the tube surface is assured. The inner crests of each strip by entering between the inner crest of the other strip, instead of engaging them and arresting movement of the strips radially of the tube, wedge the side walls of the corrugations of both strips apart slightly, wherever necessary, until the circumferential edges defining the slots are in firm engagement with the circumferential wall of the tube. The crests thus adjust the corrugations so as to position the fins in proper spaced relation endwise of the strip and tube, with each wall 5 of one strip substantially coplanar with a wall 5 of the other strip.

Likewise, in general, this staggered relation results in contact or tangency between the two side walls of each corrugation of one strip with the side walls of the crest of a corrugation of the other strip aligned with the space between the two side walls.

The strips 2 and 3 can be held in place temporarily or permanently by various means.

For example, the strips, as subassemblies, are held in position on the tube by extraneous equipment, they may be soldered together and to the circumferential wall of the tube. This is satsifactory as a permanent bond for cryogenic uses. However, for heat exchange at elevated temperature, it is preferable that the strips be held in place by tack welding or by suitable cement which is of the type which vaporizes at brazing temperatures. Prior to assembly or while thus tacked or cemented, brazing material is applied. Thereafter, the tube and two strips are all brazed together.

When brazed, the strips are bonded together at the points of tangency of their respective crests as well as to the tube. In accordance with the present invention, not only is ease in handling of the strips provided, but self-spacing of the fins during installation is effected.

Figure 4:
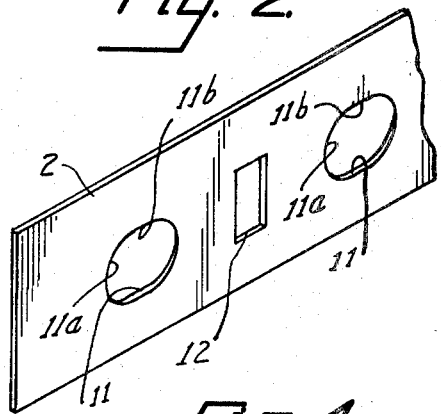
FIG. 4 is a perspective view of a strip of sheet metal showing the manner in which it is to be punched and corrugated to provide a group of interconnected fin portions each of which extends around one-half the circumference of the tube, and is on a reduced scale.

As mentioned, for small diameter fin tubes the saddles cannot be made economically with sufficient accuracy for effective use. However, the edges defining the notches can be accurately formed readily. In order to assure this accuracy, a strip such as illustrated in FIG. 4 is passed through a suitable punching press which punches out a plurality of apertures or holes 11, these holes being shaped, so that when the strip is corrugated, the holes become edges of the notches 8 which can embrace one-half of the circumference of a round tube and extend slightly therebeyond. As illustrated in FIG. 4, each hole 11 is elongated endwise of the strip and has semicircular edge portions 11a at its ends with intermediate straight edge portions 11b tangent thereto at the ends of the semicircular edge porions. These edge portions are such that in the corrugated strip illustrated in FIG. 1, the portions 11a can embrace half the circumference of the tube and the portions 11b can pass beyond the horizontal diametral plane of the tube and extend generally lengthwise of the tube between adjacent fins.

Such holes can be very accurately formed, especially in thin material such as used for small diameter fin tubes.

If tubes of other than circular cross-section are used, the punched holes are developed so that they can be punched in the flat and the desired edge portions defining the resultant hole will fit the selected cross-section when the strip is corrugated.

In order to facilitate bending of the strip 2 at the portion where the outer crests are to occur, the strip is provided midway between holes 11 with apertures 12, arranged one aperture 12 between each two adjacent holes 11.

The dimensions of the apertures 12 transversely of the strip 2 are the same as the like dimensions of the holes 11, so that the metal to be bent at the inner and outer crests is the same in dimension edgewise of the strip. The apertures 12 are relatively narrow in a direction endwise of the strip 2.

Figure 5:
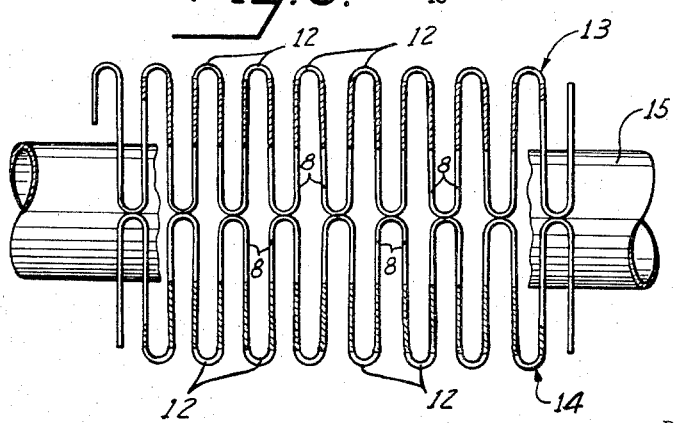
FIG. 5 is a view similar to FIG. 3 showing a modified form of the invention.

There are instances, however, in which a specific installation is desired wherein the inner crests of one strip are aligned with and engage the inner crests of the other strip. Such a structure is illustrated in FIG. 5 wherein an upper strip 13 and a lower strip 14 are used and engage a tube 15. These strips are identical with the strips 2 and 3. In this form, the hole punched in the strip will be similar to the hole 11 but with somewhat shorter tangent edge portions 11b.

Generally the strips are of thin material that can be corrugated and deformed easily with sufficient accuracy so that the crests of the corrugations meet and can be bonded together. These crests, when meeting in this manner, can be distorted slightly by the pressure of the two strips as they are pressed against each other radially of the tube, so long as the metal is of the proper stiffness relative to its thickness and the height of the fins.

Figure 6:
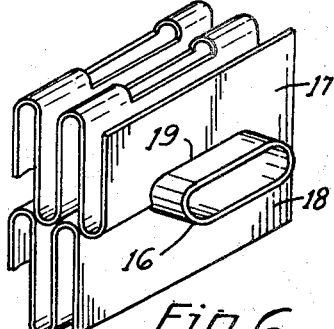
FIG. 6 is a view of a fin tube similar to that illustrated in FIG. 1 illustrating a modification of the invention wherein the tube is noncircular in cross section.

In FIG. 6 there is illustrated a tube which is not of round cross-section, but is one such as may be formed by flattening of a tube of circular cross-section so that, in flattened cross-section, it has semicircular ends joined by parallel sides tangent to the ends. Such a tube, indicated at 16, is provided with fins formed of corrugated sheets 17 and 18 of the general type such as described in connection with FIG. 1, except that the holes to form the notches 19 are differently shaped to correspond with the different cross-sectional shape of the tube 16. This shape of tube is one in which edgewise helical wrapping would be impractical under known methods. A tube of this shape is desirable in many instances. For example, the gas flow may be in the direction of the long dimension of the cross-section of the tube. Also a tube of this nature has the advantage in that to meet those requirements wherein the tube itself must be bent transversely of its longitudinal axis, the flattened tube 16 can be bent about the longer axis of its cross-section much more readily and at a considerably sharper radius of curvature than could a like size tube of circular cross-section.

In all other respects the combination may be the same as described in connection with FIG. 1 or 5.

It is apparent from the foregoing description that the disadvantages of the prior art, as hereinbefore discussed, are overcome by the present invention thus providing for economical production by quantity production procedures of fin tubes of circular and noncircular cross sections, respectively, having small diameters or cross-sections and closely spaced and thin fins which can be unlimited in width to thickness ratio.

Having thus described my invention, I claim:

1. A fin tube comprising a length of tube, a pair of corrugated metal strips, each strip having a plurality of corrugations extending transversely of its length and arranged in a row which extends lengthwise of the strip, said corrugations having inner and outer crests in alternate relation endwise of the row and having spaced side walls joining each inner crest to the two outer crests next adjacent to it along the strip, each corrugation having a notch extending in a direction transversely of the corrugation through its inner crest and through a portion of each side wall adjacent to its inner crest such that the notch is bounded by a peripherally exposed edge surface of the adjacent metal of the strip extending the full thickness of the metal, each notch being shaped so that said edge surface substantially fits the outer wall surface of the tube for at least substantially one-half of the peripheral extent of said outer wall surface, said strips being arranged at diametrically opposite sides of the tube and each strip having its said exposed edge surfaces permanently bonded to the peripheral outer wall surface of the tube throughout substantially the entire extent of its said fitting edge surface by interposed metallic capillary bonding films.

2. A fin tube according to claim 1 wherein the two strips are positioned endwise of the tube with the inner crests of one strip offset endwise of the tube from the inner crests of the other strip so that each inner crest of one strip lies in the space between two adjacent inner crests of the other strip.

3. A fin tube according to claim 2 wherein each inner crest of one strip is permanently bonded to the two inner crests of the other strip between which it is disposed.

4. A fin tube according to claim 1 wherein the inner crests of one strip are aligned with the inner crests of the other strip, respectively, and are permanently bonded thereto.

References Cited
UNITED STATES PATENTS

| | | | |
|---|---|---|---|
| 1,886,498 | 11/1932 | Phelps | 165—171 |
| 2,782,009 | 2/1957 | Rippingille | 165—166 |
| 3,024,003 | 3/1962 | Speca et al. | 165—166 |
| 2,940,162 | 6/1960 | Sandberg | 165—181 X |
| 3,147,800 | 9/1964 | Tadewald. | |
| 3,217,798 | 11/1965 | Renzi. | |

ROBERT A. O'LEARY, *Primary Examiner.*

T. W. STREULE, *Assistant Examiner.*